April 1, 1941.    J. R. WATSON    2,237,206
HYDRAULIC BRAKE IMPULSE REGULATOR FOR TRAILERS
Filed Dec. 6, 1939    2 Sheets-Sheet 1
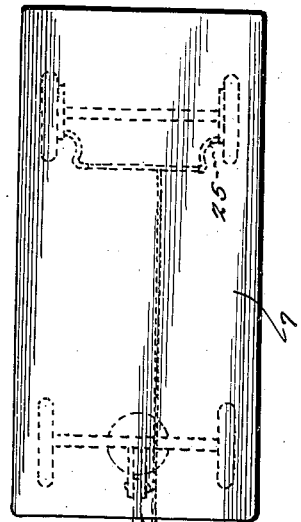
Fig. 1.
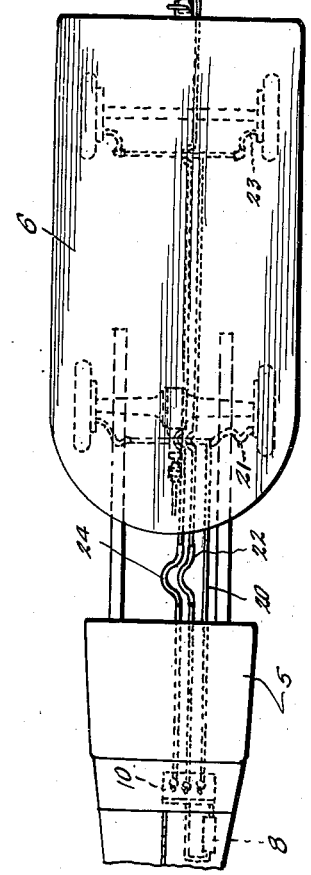
Fig. 4.
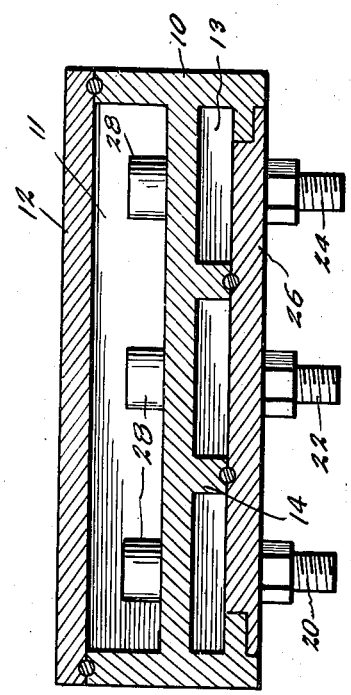
Inventor
James R. Watson
By Clarence A. O'Brien
and Hyman Berman
Attorneys

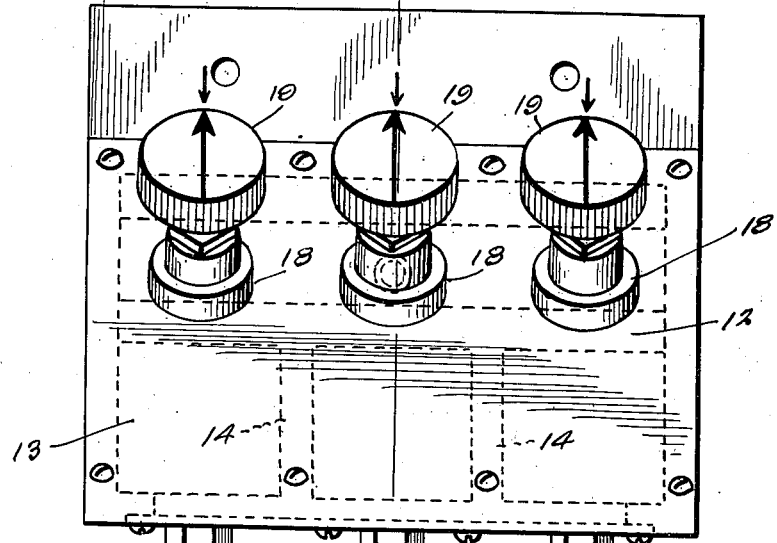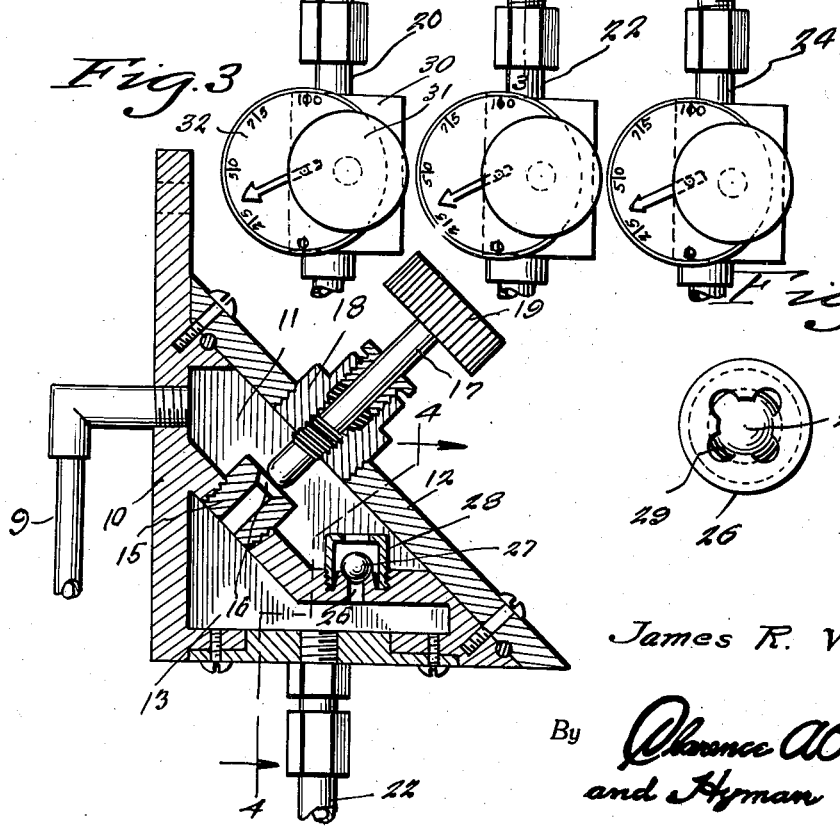

Patented Apr. 1, 1941

2,237,206

UNITED STATES PATENT OFFICE 2,237,206

HYDRAULIC BRAKE IMPULSE REGULATOR FOR TRAILERS

James R. Watson, San Bernardino, Calif.

Application December 6, 1939, Serial No. 307,918.

4 Claims. (Cl. 188—3)

The present invention relates to hydraulic brake impulse regulators which are operated in a train and has for its primary object to provide means whereby the braking impulse or portions thereof may be regulated or selectively retarded for applying the brakes of the respective vehicles of the train, or at the option of the driver or operator he may so direct the brake impulse toward that portion of the train that requires, by virtue of the load carried, the greatest amount of braking and if he so desires by selectivity to promote a pressure constant at said selected point. By so doing the heavier braking force may be applied where the greatest load is carried and minimizes tire wear on light loaded portions where braking is not needed.

In those instances where conditions are found in heavy duty hauling or various and sundry other conditions, when a tractor or truck may be hitched to one or more trailers it is desirable to provide a braking system where the braking impulse first takes effect at the rear of the entire hook-up and travels forwardly, finally equalizing throughout the entire unit.

It is accordingly an object of the present invention to provide control means in the system and operable from a point in the tractor to selectively regulate the braking impulse transmitted to the various vehicles.

A further object is to provide a device of this character of simple and practical construction, which is efficient and reliable in performance, relatively inexpensive to install in operative position and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which Figure 1 is a top plan view of a vehicle train showing the braking system provided therefor.

Figure 2 is a front elevational view of the housing for the control valve in the system for the various brakes.

Figure 3 is a sectional view taken through one of the control units substantially on a line 3—3 of Figure 2.

Figure 4 is a sectional view taken substantially on a line 4—4 of Figure 3, and

Figure 5 is a top plan view of the cage for one of the check valves.

Referring now to the drawings in detail, wherein for the purpose of illustration I have disclosed a preferred embodiment of the invention, the numeral 5 designates a tractor connected with a front trailer 6 and to the rear end of which is secured a rear trailer 7.

The master cylinder of the hydraulic brake system is designated at 8 which is operated by the brake pedal (not shown) in the usual manner from the tractor 5 and to which is connected the pipe 9 leading to the housing 10 of a pressure regulating unit in which a main chamber 11 is provided having direct communication with the pipe 9.

The housing 10 is preferably of substantially triangular shape in cross section, as more clearly shown in Figure 3 of the drawings, and is provided with a top cover plate 12 positioned at an inclined angle with respect to the driver of the tractor to constitute a control panel. Arranged in the housing beneath the main chamber 11 are a plurality of control chambers 13 separated from each other by partitions 14 and having communication with the main chamber by means of a nipple 15 having its end adjacent the main chamber provided with a valve seat 16. A valve 17 is threaded through a packing member 18 with its inner end adapted to seat on the valve seat 16 and having its outer end provided with the manipulating knob 19.

Communicating with one of the control chambers 13 is a pipe 20 leading to the brakes 21 of the tractor, while a pipe 22 leads from another of the control chambers 13 to the brakes 23 of the front trailer 6 and a pipe 24 leads from still another of the control chambers 13 to the brakes 25 of the rear trailer 7. Each of the control chambers 13 is, of course, provided with one of the control valves 17.

A pressure release passage 26 is also provided between each of the control chambers 13 and the main chamber 11 and is controlled by a ball check valve 27 mounted in a cage 28 removably secured in position over the ball. The top of the cage is formed with an opening 29 of irregular contour to prevent restriction of the return of the fluid from the control chamber 13 into the main chamber 11 when the brakes are released.

In each of the pipes 20, 22 and 24 is interposed a reduction valve of conventional construction and shown generally at 30 and having a manual control wheel 31. Each valve includes a pressure gauge 32 giving visual indication of the selected, necessary or desired pressure.

In the operation of the device it will be apparent that the respective valves 17 may be manipulated to control the pressure of fluid passing from the main chamber 11 into the respective control chambers 13 whereby to control the application of the braking impulse initially to one set of brakes and subsequently and successively to the remaining brakes. Accordingly, the braking force may be regulated in the judgment of the operator depending on the distribution of the load being carried.

As illustrative of the operation of the invention on substantially level roads, let it be assumed that the master cylinder 8 will supply a maximum braking pressure of one hundred and fifty pounds per square inch, the tractor 5 weighs two and a half tons, the trailer 6 plus load weighs five tons and the trailer 7 plus load weighs ten tons. All reduction valves 30 are opened, preferably, by hand wheels 31 in which position of these valves the pressure gauges 32 read zero. Trailer 7 being the heaviest unit of the train and also the rear one, should receive the maximum braking pressure undelayed and first. Therefore, the operator sets valve 17 related to line 24 of the rear trailer to open position. The trailer 6 weighing fifty per cent less than trailer 7 should receive fifty per cent less braking pressure delayed. Therefore valve 17 related to line 22 of trailer 6 is open half way. Tractor 5 should receive fifty per cent less braking pressure than trailer 6 further delayed. Therefore, valve 17 related to line 20 of tractor 5 is opened one quarter. Under such settings of valves 17, trailer 7, trailer 6 and tractor 5 receive one hundred and fifty pounds, seventy-five and thirty-seven and one-half pounds pressure, respectively, and successively beginning with the rear trailer 7. After the brakes have been applied and taken effect the braking pressure against all units is gradually equalized as obviously the system will eventually equalize itself.

Considering now a different situation, as for instance, braking for a 15 mile down grade, where constant braking is desired and it is preferable that pressure predetermined by setting of the valves 17, for instance those pressures previously discussed, be maintained so as to apply the same for a long period of time. Valves 17 are opened to the same extent as previously indicated to apply one hundred and fifty pounds, seventy-five pounds and thirty-seven and one-half pounds pressure to the trailer 7, trailer 6 and tractor 5, respectively just as in the first discussed situation. Then the reduction valves 30 related to lines 20, 22 and 24 of tractor 5, trailer 6 and trailer 7, respectively, are closed to set the same at thirty-seven and one-half pounds, seventy-five pounds and one hundred and fifty pounds respectively. Thus the predetermined pressures are maintained in the lines 20, 22, 24 for the required period of time, the reduction valves 30 operating as governors maintaining the flow of pressures predetermined by valves 17 constant.

It is believed the details of construction and manner of operation of the device will be readily understood from the foregoing without further detailed explanation.

Having thus described the invention, what I claim is:

1. A control device for the hydraulic brake system of a vehicle train wherein each vehicle of the train is provided with individual brakes, said control device comprising a housing having a main chamber therein, a conduit leading from a source of fluid braking force to the chamber, a plurality of control chambers in the housing each having communication with the main chamber, a manual control valve between each control chamber and the main chamber, conduits leading from each control chamber to the brakes of the respective vehicles and a check valve between each control chamber and the main chamber adapted to accelerate return of fluid from the control chambers to the main chamber.

2. A control device for the hydraulic brake system of a vehicle train wherein each vehicle of the train is provided with individual brakes, said control device comprising a housing having a cover plate, a main chamber in the housing communicating with a master brake cylinder, a plurality of individual chambers in the housing communicating with the brakes of the respective vehicles, a passage between each control chamber and the main chamber, a manually operable valve for each passage and carried by the cover plate and a check valve between each control chamber and the main chamber arranged to open upon a release of the brakes.

3. In a hydraulic brake system for a vehicle train in which each vehicle is provided with individual brakes operated through a master brake cylinder and control means between the master cylinder and the brakes adapted to proportion the braking impulse transmitted to the respective brakes, said control means comprising a chamber common to all of the brakes and having a fluid conduit connected to the master cylinder, feed pipes for the respective brakes and valves controlling passage of the fluid from the chamber to the feed pipes.

4. A control device for the hydraulic brake system of a vehicle train wherein each vehicle of the train is provided with individual brakes, said control device comprising a housing having a main chamber therein, a conduit leading from a source of fluid braking force to the chamber, a plurality of control chambers in the housing each having communication with the main chamber, a manual control valve between each chamber and the main chamber, conduits leading from each control chamber to the brakes of the respective vehicles, a check valve between each control chamber and the main chamber adapted to accelerate return of fluid from the control chambers to the main chamber and a manually controlled valve between each control chamber and its connected brake.

JAMES R. WATSON.